Sept. 6, 1955          H. R. KARLEN          2,717,303
ELECTRICAL CONTROL CIRCUIT FOR HEATING APPARATUS
Filed Sept. 25, 1951
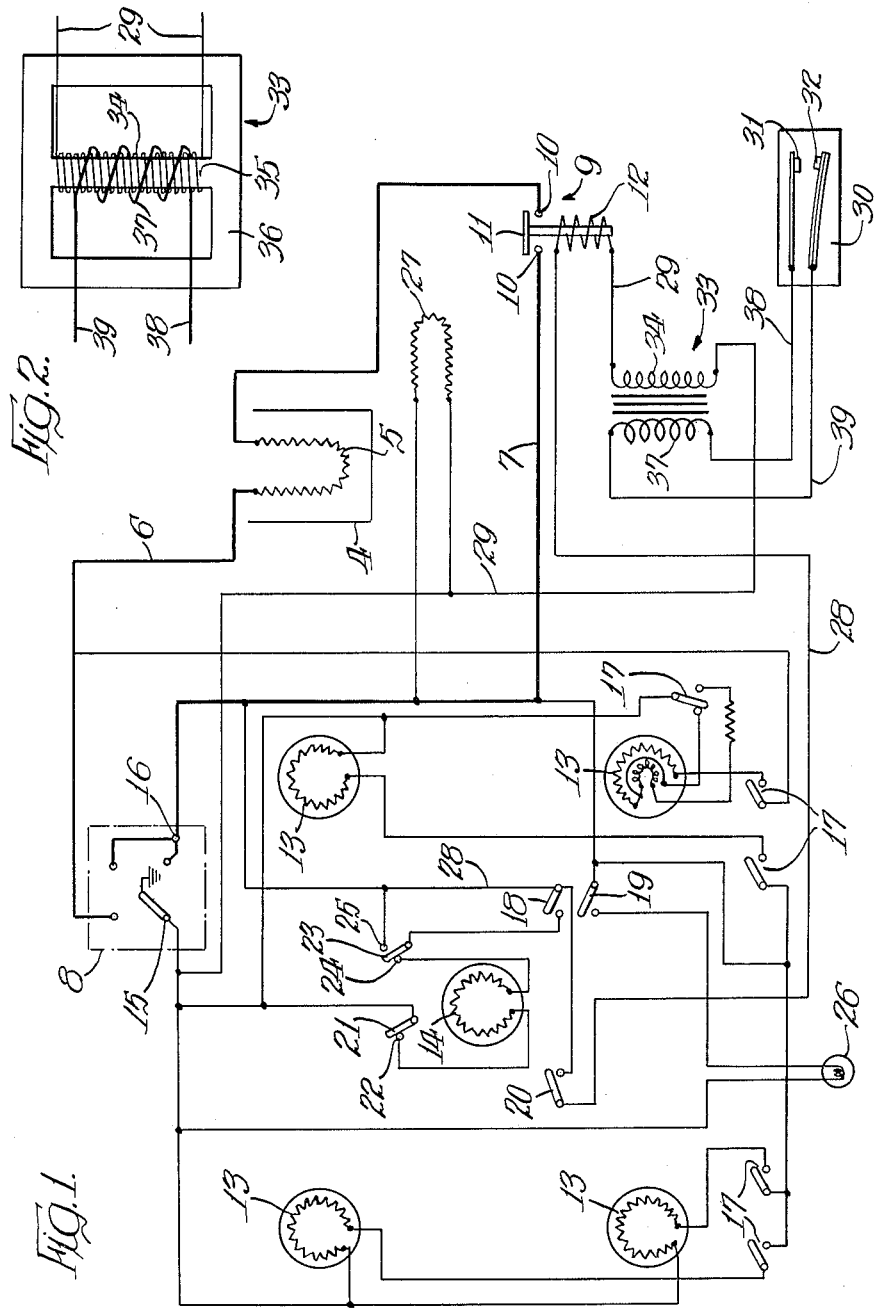
INVENTOR.
Harvey R. Karlen
BY
Hemming & Hemming
Attys.

United States Patent Office 2,717,303
Patented Sept. 6, 1955

2,717,303

ELECTRICAL CONTROL CIRCUIT FOR HEATING APPARATUS

Harvey R. Karlen, Chicago, Ill., assignor to Cory Corporation, Chicago, Ill., a corporation of Delaware Application September 25, 1951, Serial No. 248,223

4 Claims. (Cl. 219—20)

This invention relates generally to an electrical control circuit for a heating apparatus and more particularly to a thermostatically controlled circuit for heating a body of liquid such as in coffee brewers and like apparatus.

In apparatus of the character above generally described it is desirable to maintain the body of liquid at a predetermined temperature and thus regulation of the apparatus is under the control of a thermostat switch responsive to the temperature of the body of liquid. Customarily and necessarily the thermostat switch does not control the heating device or element directly but acts through a relay. Despite this provision for reduction of the current flow through the contacts of the thermostat switch and the voltage across the same, considerable arcing and burning of the contacts takes place. Moreover, inasmuch as contacts of the thermostat switch are connected directly in circuit with the coil of the relay there is a considerable inductive kick in the circuit as the contacts are opened and closed which results in high voltage across the contacts, thereby contributing to the arcing and burning and causing erratic operation of the thermostat.

It is a primary object of this invention therefore to provide a new and improved thermostat circuit which substantially eliminates high voltage at and arcing and burning of the thermostat contacts.

A more particular object is to provide a control circuit in which the thermostat is coupled to the circuit incorporating the control relay through an inductive device acting through variation in impedance and without actual make or break of the circuit to control the relay.

Other objects and advantages will become apparent from the following detailed description taken in connection with the accompanying drawing, in which:

Fig. 1 is a diagrammatic representation of a control circuit embodying the features of this invention; and Fig. 2 is an actual showing of the inductive coupling device.

For purposes of illustration and purely as an exemplary disclosure the invention is herein shown as embodied in the circuit of a beverage brewer of the type disclosed in the H. W. Peters et al. patent, No. 2,551,219. The disclosure in this embodiment is for the purpose of providing environment and background, it being clearly understood that the invention may, of course, be employed in a variety of different environments without departing from the spirit and scope of the invention.

A heating apparatus with which a circuit of the type herein disclosed could be employed would have some tank or vessel 4 for containing the body of liquid, the temperature of which is to be maintained at some desired value. Located with respect to the tank, to be capable of heating the fluid therein, is a heating element or device 5 which herein is shown as an electrical heating coil. This coil is by leads 6 and 7 connected across a source 8 of suitable electrical potential usually on the order of 230 volts. This source preferably is of a character also providing the conventional 110 to 115 volts of the household circuit. The heating coil 5 is under the control of a relay generally designated 9 having a pair of stationary contacts 10 interposed in the lead 7 and a movable contact 11 serving to make or break the circuit to the heating element by bridging or unbridging the contacts 10. The relay 9 is of a conventional solenoid type biased to open position by a spring (not shown) and having an actuating winding 12 for moving the contact 11 to bridging position against the action of the spring.

Save for the fact that certain switches enter into the circuit for the winding 12 of the relay 9, the major portion of the circuit shown in Fig. 1 forms no part of this invention. Suffice it to say, therefore, that resistance elements 13 and 14 are all heating or warming devices for maintaining decanters of fluid placed thereon at various desired temperatures. The elements 13 are connected to the low voltage contacts of the source 8, namely the neutral contact 15 and one of the high voltage contacts 16, and are controlled by manually actuated switches 17. Inasmuch as the circuits are readily traced on the drawing, and inasmuch as the precise operation of these elements and other switches form no material part of the invention, the circuits are not described in greater detail.

Element 14 is also connected to the low voltage portion of the source 8 through the medium of a variety of switches. Included among these switches is a switch 18 forming part of a multiple switch also including switches 19 and 20, all of which are simultaneously closed or opened as an incident to the manipulation of a single control handle. Switch 18, through a circuit readily traceable, connects one end of element 14 to the terminal 16. The other end of the element 14 is connected to the terminal 15 through a blade 21 which is slidably, but continuously in contact with a terminal 22. A similar blade 23 forming a part of the circuit through the switch 18 is in slidable, but continuous engagement with a contact 24 and is swingable, under the control of a beam scale, into engagement with a contact 25 to complete a circuit in parallel with the switch 18. Switch 19 controls a circuit to a signal light 26 and switch 20 is in a circuit for the coil 12 of the relay 9 as will presently be more fully described.

A standby heating element 27 serves to maintain the body of fluid at a tepid value so that the fluid may be that much more readily raised to the desired temperature by the main heating element 5. Like the element 5, element 27 is an electrical element and is permanently connected in the low voltage circuit so as to be operative at all times.

Coming now to the control circuit constituting the primary feature of this invention, the winding 12 of the relay 9 has one terminal connected by a lead 28, which includes the switch 20, to the terminal 16 of the source 8. The other terminal of winding 12 is by a lead 29 connected to terminal 15 of the source 8. While the switch 20 is included in this circuit, it is not the means for exercising primary control over the relay 9 but functions merely as a means for conditioning the control circuit. Actual control of the relay 9 is under a thermostat 30 positioned to be responsive to the temperature of the body of fluid heated by the element 5. The thermostat 30 is of the conventional make and break type having a pair of contacts 31 and 32, one of which is stationary and the other of which is carried by a bimetallic element designed to close the contacts when the temperature of the body of fluid drops below a predetermined value and to open the contacts when the temperature rises above a predetermined value. Control of the relay 9 by the thermostat 30 is here effected without an opening of the circuit including the actuating winding 12 of the relay through the medium of an inductive device generally designated 33 functioning to control the voltage applied to the coil 12 through variation of the impedance in a winding 34, forming a part of the device 33 and connected in series with the coil or winding 12. As best seen in Fig. 2, winding 34 is wound on the center leg 35 of an 8-shaped core 36.

Completing the device 33 and also wound on the center leg 35 is a winding 37 having one end connected by a lead 38 to the contact 31 and the other end connected by lead 39 to the contact 32 of the thermostat. In this particular embodiment the turns of the windings 34 and 37 are in the ratio of 5 to 1 with winding 34 herein specifically having 750 turns and winding 37 having 150 turns. The normal impedance of winding 34 when the contacts of thermostat 30 are open is such that the voltage across the coil 12 is not sufficient to overcome the bias urging the relay to open position and thus contacts 10 remain unbridged. Upon closure of the contacts of the thermostat and the resultant completion of the circuit containing the winding 37, the impedance of the winding 34 is lowered to such an extent that the coil 12 is energized to the degree that the movable contact 11 bridges the contacts 10, thereby completing the circuit to the heating element 5.

It will be seen from the foregoing that once the switch 20 has been closed to condition the control circuit, actuation of the relay 9 is effected without the opening or closing of the control circuit. Thus there is, in the first place, no breaking or making of a circuit which includes both the winding of the relay and the thermostat contacts. As a consequence the thermostat contacts are in this arrangement no longer subjected to the arcing and burning caused by the high voltage set up by the reaction to the breaking of a highly inductive circuit. Moreover, the thermostat contacts now operate and are subjected to a much lower voltage than even the ordinary 110 volt household circuit. Because the thermostat now is subjected to low voltage only, it is much more accurate and stable because there is such little fluctuation in voltage. Finally, energization or deenergization of the relay 9 does not involve any change in total voltage drop of the control circuit but a mere shifting of the voltage from one winding to another. Thus there is not set up the change in voltage and the resultant changes in flux which heretofore set up the momentary high voltage across the contacts of the thermostat.

The foregoing detailed description is given for clearness of understanding only and no unnecessary limitations are to be understood therefrom, as some modifications will be obvious to those skilled in the art.

I claim:

1. In a fluid heating apparatus having a vessel for containing a body of fluid and a heating device for heating the body of fluid, a control system for governing the heating device comprising: an electrically actuated controller for the heating device biased in one direction and including an actuating winding; a closed energizing circuit for said controller independent of the heating device; a make and break thermostat responsive to the temperature of the body of fluid to be heated; a governing circuit including said thermostat; reactance means having a first winding connected in said energizing circuit in series with the actuating winding of said controller and normally having an impedance of a value preventing actuation of said controller against its bias; and a second winding connected in series only with said thermostat and inductively coupled with said first winding to vary the impedance thereof as an incident to opening and closing of said thermostat.

2. In a fluid heating apparatus having a vessel for containing a body of fluid and a heating device for heating the body of fluid, a control system for governing the heating device comprising: a relay, having an actuating winding, operable to control the heating device, said relay being biased in a direction to arrest operation of the heating device; a closed energizing circuit for said relay including the winding thereof; a make and break thermostat responsive to the temperature of the body of fluid to be heated; a governing circuit including said thermostat; and a reactance means having a first winding connected in said energizing circuit in series with the winding of said relay and having an impedance of a value normally preventing application of sufficient voltage to the coil of said relay to hold the same against its bias and having a second winding connected in said governing circuit and inductively coupled with said first winding to lower the impedance of said first winding to permit application of a voltage to the coil of said relay when said thermostat is closed which is high enough to cause actuation of said relay against its bias.

3. In a control system for heating a body of fluid, an electrical heating element for heating the body of fluid; a power circuit for said heating element including a source of electrical energy and a switch connected in series with said element to control the energization thereof; a relay governing said switch biased to open position of the switch and having an actuating winding which when energized to a normal degree functions to close said switch; an energizing circuit for said relay independent of the heating element including the winding of said relay and a winding connected in series therewith and normally having an impedance of such a value as to prevent energization of said relay winding to a normal degree; a make and break thermostat responsive to the temperature of the body of fluid to be heated; and a governing circuit comprised solely of said thermostat and a third winding, said third winding being inductively coupled to the second winding of said energizing circuit and having a turn ratio relative to said second winding as to permit said relay winding to be energized to a normal degree when said thermostat is closed.

4. In a control system for heating a body of fluid, an electrical heating element for heating the body of fluid; a power circuit for said heating element including a source of electrical energy and a switch connected in series with said element to control the energization thereof; a relay governing said switch biased to open position of the switch and having an actuating winding which when energized to a normal degree functions to close said switch; an energizing circuit for said relay including the winding thereof and a winding connected in series therewith and normally having an impedance of such a value as to prevent energization of said relay winding to a normal degree; a make and break thermostat responsive to the temperature of the body of fluid to be heated; and a governing circuit comprised solely of said thermostat and a third winding, said third winding being inductively coupled to the second winding of said energizing circuit and having a turn ratio of 1:5 relative to said second winding so as to permit said relay winding to be energized to a normal degree when said thermostat is closed.

References Cited in the file of this patent

UNITED STATES PATENTS

| | | |
|---|---|---|
| 1,204,731 | Baily et al. | Nov. 14, 1916 |
| 1,626,515 | Cook | Apr. 26, 1927 |
| 1,730,254 | Thomas | Oct. 1, 1929 |
| 1,894,095 | Hall | Jan. 10, 1933 |
| 1,984,063 | Graham | Dec. 11, 1934 |
| 2,057,585 | Palmer | Oct. 13, 1936 |
| 2,158,133 | Lemp | May 16, 1939 |
| 2,551,219 | Peters et al. | May 1, 1951 |